United States Patent [19]
Davis et al.

[11] Patent Number: 5,215,764
[45] Date of Patent: Jun. 1, 1993

[54] EXTRUDER MIXING SCREW

[75] Inventors: Martin E. Davis; J. Wayne Hook, both of Wichita, Kans.

[73] Assignee: Westland Corporation, Wichita, Kans.

[21] Appl. No.: 884,024

[22] Filed: May 18, 1992

Related U.S. Application Data

[63] Continuation-in-part of Ser. No. 712,579, Jun. 10, 1991, abandoned.

[51] Int. Cl.$^5$ .............................................. B29C 47/00
[52] U.S. Cl. ..................................... 425/208; 366/88; 366/89; 366/90; 425/209
[58] Field of Search ................. 425/200, 208, 209; 366/79, 88, 89, 90

[56] References Cited

U.S. PATENT DOCUMENTS

| | | | |
|---|---|---|---|
| 3,486,192 | 12/1969 | Le Roy | 425/202 |
| 3,587,450 | 6/1971 | Smith | 425/208 |
| 3,652,064 | 3/1972 | Lehnen et al. | 366/88 |
| 3,788,614 | 1/1974 | Gregory | 425/209 |
| 3,941,535 | 3/1976 | Street | 425/208 |
| 4,085,461 | 4/1978 | Maillefer | 425/208 |
| 4,227,870 | 10/1980 | Kim | 425/208 |
| 4,330,214 | 3/1982 | Willert | 366/79 |
| 4,752,136 | 6/1988 | Colby | 366/89 |
| 4,944,906 | 7/1990 | Colby et al. | 425/208 |
| 4,964,730 | 10/1990 | Alzner et al. | 425/208 |

OTHER PUBLICATIONS

Rauwendaal, Chris, "How to Improve Mixing in Single-Screw Extruders", *Plastics World*, Nov. 1990, pp. 45–49 and Jan. 14, 1991, pp. 43–47.

*Primary Examiner*—David A. Simmons
*Assistant Examiner*—William J. Matney, Jr.

[57] ABSTRACT

A mixing section for an extrusion or injection screw has alternating helical wiping and barrier lands which form inlet and outlet channels therebetween, with the barrier lands having a greater helix angle than the wiping lands, creating a conjunction of the adjoining wiping and barrier lands near the input and exit ends of the mixing section. The barrier lands also have notches cut therefrom to promote mixing and throughput. The barrier lands are widened at the conjunction with the wiping lands to form the termination of the downstream end of the inlet channels and the beginning of the upstream end of the outlet channels. Some or all of the channels do not have uniform depths such that the channels gently rise up to the narrowed beginning of the outlet channels and the narrowed ending of the inlet channels, with this tapering avoiding any pocket or hang-up area where melt flow could gather or degrade.

8 Claims, 2 Drawing Sheets

EXTRUDER MIXING SCREW

This is a continuation-in-part of application Ser. No. 07/712,579, filed Jun. 10, 1991, now abandoned.

BACKGROUND OF THE INVENTION

1. Field of the Invention

The present invention relates in general to extruder and injection molding screws of the type used for the melting and movement of polymeric material within a plasticizing cylinder from an inlet feed opening to the discharge opening at the end of the cylinder. In particular, the present invention relates to such an extrusion or injection screw having an improved mixing section which achieves dispersive and distributive mixing of the polymer without excessive shear while operating at a high RPM or production rate.

2. Description of the Prior Art

Extruder and injection screw design technology has been known for many years. The typical configuration includes a feed section, a transition section and a meter section arranged along the length of the screw, which is rotatably housed within a cylinder. The polymer material (or resin) is fed into the cylinder at the feed section of the screw. A helical land (or flight) on the screw serves to convey the resin forward in the cylinder upon rotation of the screw.

The resin moves within a helical channel defined by the screw flights, the screw shaft (or root) and the internal wall of the cylinder. As the resin enters the transition section, the root becomes gradually larger in diameter and the screw channel, bounded by the continuing flight, therefore becomes gradually more shallow. The cylinder is externally heated and the resin is compressed, conveyed and initially melted as it is moved forward in the progressively smaller screw channels of the transition section. The resin then moves into the metering section where final melting of any previously unmelted particles is completed.

The metering section typically has a shallow screw channel but a constant root diameter which, in combination with the continuing helical screw flight and screw rotation, moves the melted resin forward toward the discharge opening. The resin is forced through the discharge opening either by the continued rotation of the extruder screw, or by an injection stroke forward of an injection screw.

Some screw designs are altered to provide for a secondary (or barrier) flight which is located in the transition section, and which is undercut or spaced a short distance from the cylinder wall, allowing a separation of the melt from unmelted solid resin by the flow of melted resin over the undercut barrier flight as the material is conveyed forward in the plasticizing process. Barrier screws are designed to provide an efficient melting of the polymer achieving a high melt quality while operating at a slower RPM. Such barrier screw designs are now common, and the Willert screw disclosed in U.S. Pat. No. 4,330,214 is a notable example. While barrier screws have a particular application, they cannot be operated at the relatively high speeds necessary for many commercial operations without overworking the polymer. Many applications require that the plasticizing equipment be operated at relatively high speeds to obtain the desired economic efficiencies. Faster production rates may be used but may result in the barrier screw churning the material and creating stresses in the parts formed as end products from the material, as well as parts not likely to retain the required dimensional consistency and accuracy, due to overworking the polymer. The additional stresses must be relieved by increasing the "clamp time", or the time the part remains in the mold, to avoid distortion of the stressed material upon cooling. In addition, the Willert reference discloses a screw with no inlet channel, and the helix angle of the barrier and wiping lands are both the same angle. Barrier screws accomplish a limited mixing of the melt.

For the foregoing and other reasons, it is often considered desirable to utilize metering screws in a plasticizer and to also provide a relatively short mixing section in the metering section to provide improved mixing of the melt and to help insure a complete melting of all resin solids. A mixing section for a metering screw is required for disbursing solids such as coloring throughout the extrudate, and is generally located at or near the end of the metering section of a standard metering screw or a barrier screw. Mixing section designs are also common in the industry, of which U.S. Pat. No. 4,752,136 to Colby, U.S. Pat. No. 3,941,535 to Street, and U.S. Pat. No. 3,788,614 to Gregory are notable examples. An early design by LeRoy, U.S. Pat. No. 3,486,192, originally assigned to and known as the Union Carbide mixer, is still employed in the industry.

It is generally agreed that all or substantially all of the resin must be melted prior to entering the mixing section of a screw to enable satisfactory mixing action. This melting process may be accomplished either by a properly designed three-zone meter screw configuration or a barrier screw configuration, which precedes the mixing section. Much prior art is known relative to the design of these configurations, some of which has been referenced previously. It is well-known that neither standard meter screw nor barrier screw configurations achieve optimum mixing of the melt without incorporating a downstream mixing section. Willert purports to achieve this final mixing or blending of the melt through reversing the action of the screw by changing the barrier land to a wiping land and the wiping land to a barrier land at the forward end of the barrier zone. Others simply add a mixing section in the meter zone of their screws such as Colby, Street, or Gregory. The present invention provides an improved mixing section of this type.

Colby's mixing section design embodies a helical valley in the metering section of the screw divided into side-by-side relatively shallow and relatively deep levels extending along the valley in side-by-side helical paths. Each path has a different pitch than the pitch of the adjacent helical flight so that the helical flight periodically interrupts the helical paths. During operation, the level differential induces a continuous tumbling and mixing action upon the molten resin in the mixing section.

U.S. Pat. No. 3,941,535 to Street discloses a mixing section having a plurality of helical channels without dead ends. The lands or protuberances extending between the channels are of equal height, but all lands contain notches therein creating passageways for separating and recombining the melt to effect high volume mixing. The lands are undercut from a normal screw flight height, and are therefore spaced from the cylinder bore to give intensive high shear treatment to the melt in the space therebetween. However, the protuberances are all undercut to a barrier land height and the mixer contains no wiping lands to assure minimum screw recovery time in an injection screw or pumping effectiveness in an extruder screw. Moreover, the design of the notches does not facilitate rapid color change.

U.S. Pat. No. 3,788,614 to Gregory discloses a mixing section having inlet and outlet grooves or channels arranged in a helical manner. These inlet and outlet channels are of equal width, with the inlet channels having dead ends which cause the melt to flow over the adjacent land into the outlet channel or over the closed end of the inlet channel to exit the mixing section. The mixing section of Gregory, however, is of uniform diameter (i.e., the lands all have the same height) with the channels formed therein, providing dispersive mixing and temperature uniformity of readily degradable polymers or mixtures containing such. However, Gregory does not provide for wiping lands which are needed for pumping ability and enhancement of the heat transfer from the heating elements exterior of the plasticizer to the plastic material in the apparatus. In addition, the closed ends of the inlet channels form dead spots which are not conducive to producing isothermal melt quality and they impede rapid color change.

LeRoy's design is similar to Gregory's, except that the inlet and outlet channels are arranged longitudinally in the mixing section and the lands defining the channels alternate in height with one being a wiping land with substantially the same clearance from the cylinder wall as the screw flight. The wiping lands force the molten polymer over barrier lands into the outlet channels to exit the mixing section. By this action, the LeRoy design purports to eliminate unmelted solids and provide a mixing action for the melt.

U.S. Pat. No. 3,652,064 to Lehnen, et al. embodies two mixing sections in an extruder screw designed to process highly viscous materials, particularly synthetic or natural rubber stocks. The first mixing section has a countercurrent land with interruptions therein for partially backfeeding or kneading the material to prepare it for subsequent melting and conveying. The second section has two threads or lands of the same height, one of which has radial grooves or gaps therein, to divide the material into partial streams flowing backwards but having further travel under a substantially steady forward feed to compact and intensively mix the material. The two lands have a different pitch (and width) forcing the flow of the material through the gaps into the screw channel ensuring good compacting and homogenization of the material. The two lands taper off free at the start and the end so that the channels they define have free access to the adjacent channels. All of the typical dimensions of the apparatus relate to processing synthetic butyl rubber or natural rubber. The backfeeding or kneading of material in the first mixing section is desirable for preparing rubber for subsequent melting and conveying but creates undesirable excessive shear in thermoplastic material which can result in degradation. The second mixing section also causes a backward flow and shearing of the material creating a significant pressure drop and restricts the use of higher RPM's in processing thermoplastics.

SUMMARY OF THE INVENTION

The present invention is directed to the accomplishment of several objectives for both plastic extrusion and injection screws. These objectives include a metering or barrier-type screw having a mixing section which:

1. Achieves a thorough distributive mixing of the melted resin, including the mixing of colorant additives, providing a uniform melt appearance.

2. Provides dispersive mixing which includes sufficient shear upon the resin to assure the complete melting thereof, avoiding agglomerates or gels.

3. Achieves an isothermal melt of the resin with a uniform viscosity at the lowest possible temperature, thereby avoiding any thermal degradation thereof.

4. Accomplishes a pumping action, moving the melt forward through the mixing section with a minimum pressure drop therein allowing maximum throughput in an extrusion screw and minimum recovery time in an injection screw.

5. Avoids any dead spots or hang-up areas where the melt could collect and cause thermal degradation or impede color changes.

These and other objectives are achieved by a mixing section having alternating helical wiping and barrier lands which form inlet and outlet channels therebetween with the barrier lands having a greater helix angle than the wiping lands, creating a conjunction of the adjoining wiping and barrier lands near the input and exit ends of the mixing section. The barrier lands also have notches cut therefrom to promote mixing and throughput. The barrier lands are widened at the conjunction with the wiping lands to form a terminating dam at the downstream end of the inlet channels and the beginning of the upstream end of the outlet channels. Some or all of the channels do not have uniform depths such that the channels gently rise up to the narrowed beginning of the outlet channels and narrowed ending of the inlet channels, with this tapering avoiding any pocket or hang-up area where melt flow could gather or degrade.

BRIEF DESCRIPTION OF THE DRAWINGS

The objects and features of the invention noted above are explained in more detail with reference to the drawings in which like reference numerals denote like elements, and in which.

DETAILED DESCRIPTION OF THE INVENTION

Figure 1:
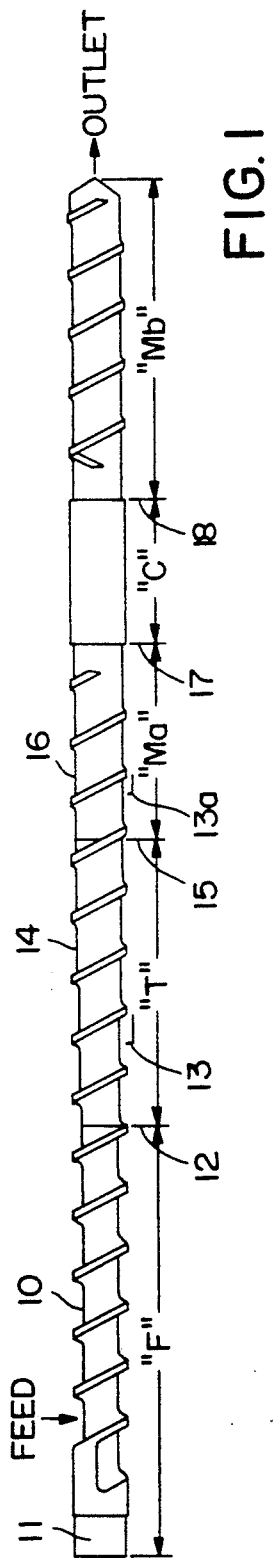
FIG. 1 is a side elevational view of an extruder screw according to the present invention.

With reference to FIG. 1, a metering-type extrusion screw 11 is shown and discussed; however, it should be noted that the mixing section of the present invention is equally useful with metering or barrier-type injection screws.

Particles of a process material or polymer entering at the location designated FEED in FIG. 1 enter a helical channel 10 of the screw 11 which rotates to advance the material along the screw toward the screw 11 OUTLET. Shear heat generated by the working of the material by the rotating screw and the temperature control of a heater band on the surrounding cylinder (not shown) initiate the melting of the material as it progresses downstream from a feed section "F" of the screw to a beginning 12 of a transition section "T". A radial depth 13 of a helical channel 14, which is a continuation of channel 10, decreases in a downstream direction, tapering to the depth 13a at a beginning 15 of a first segment of a metering section "Ma" of the screw. The radial depth 13a of a channel 16, which is a continuation of channel 14, is constant to a beginning 17 of a mixing section "C". The shear heat generated by the rotating screw, combined with the heat produced in the cylinder by the heater band, as the polymer is compressed and moved through the transition section "T" causes a high percentage of the polymer to be melted by the time it enters metering section "Ma". The close proximity of the melting polymer to the heated cylinder in the metering section "Ma" should cause the polymer to be substantially, if not completely, melted by the time it enters mixing section "C" at 17. The mixing section "C", which is the focus of the present invention and is discussed in greater detail below, functions to thoroughly mix and complete the melting of any unmelted polymer by the time it leaves the mixing section at 18.

Figure 2:
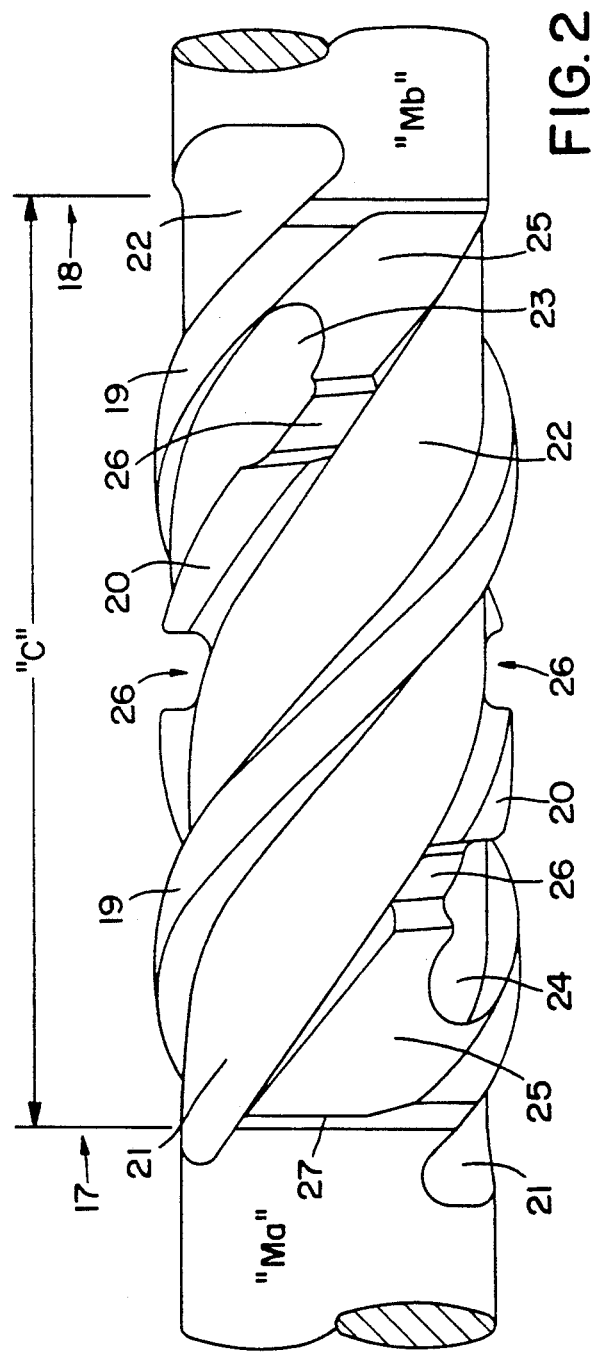
FIG. 2 is a side elevational view of the mixing section of the present invention.

FIG. 2 illustrates the mixing section of the present invention in detail, showing helical wiping lands 19 and barrier lands 20, which alternate with one another about the circumference of the screw and define inlet channels 21 and outlet channels 22 therebetween. Specifically, a wiping land is located at the leading edge, in the direction of screw rotation, of each of the inlet channels, and a barrier land is located at the leading edge, in the direction of rotation, of each of the outlet channels. The difference between barrier and wiping lands are discussed in detail below.

A tapered termination 23 of the inlet channel 21 and a tapered beginning 24 of the outlet channels 22 are shown at a conjunction 25 of the wiping lands 19 and the barrier lands 20. These conjunctions are formed as continuations of the barrier lands which extend between the barrier and wiping lands at the terminations 23 and beginnings 24, and thus form a barrier rise or dam 27 which partially blocks passage of the polymer, as will be discussed further below.

At least one notch 26 extends through each of the barrier lands 20. The notches preferably extend substantially tangential to the screw, and are preferably perpendicular to the longitudinal axis of the screw, although other configurations are possible. The number of notches in each barrier land may vary with screw diameter and mixing section length, although three is preferred and two is believed to be a minimum for acceptable performance. These notches may have any depth up to the depth of the channels, and preferably have the same depth as the inlet channels 21 and outlet channels 22 at the location of the notch. The depth of the notches may be the same for each of the notches in all of the barrier lands, each barrier land may have an individual constant notch depth or the notch depth may vary within each barrier land and between barrier lands.

The function of the notches 26 is not simply to allow material to move from one side of the barrier land 20 to the other. If there is a wiping land 19, the melt must flow over the barrier land 20 or through the notches 26, in either case disrupting the laminar flow of the melt. The apparatus of the present invention thus provides dispersive mixing with shear that is sufficient only to complete the melting process, and not to provide substantially all of the melting process as distinguished from a barrier screw which is designed to do primary plasticizing.

In operation, the melted (or substantially melted) polymer enters the mixing section "C" from the metering section "Ma" and flows into the inlet channels 21 or over the barrier rise 27 of the conjunctions 25. The entry into the inlet channels 21 is facilitated by their wide entrance created by a differential in the helix angles of the wiping and barrier lands. Helix angles of (typically) 40° for the wiping lands and of (typically) 50° for the barrier lands have proven to be most effective, although other angles may of course be employed. The angles should be chosen and the lands situated, however, such that the entrances of the inlet channels and the exits of the exit channels are widened. Additionally, the lands should not cross, as this would inhibit flow through the mixing section.

Entry into the channels is facilitated by the slightly increased channel depth created by the gradual deepening in their formation. Specifically, the root diameter within the mixing section is smaller than that of the metering section "Ma", which, when combined with the land material removed to form the notches, results in a volume or annular area available for the polymer approximately equal (95%-100%) to the annular area of metering section "Ma". This feature is essential to minimize the pressure drop within the mixing section.

The combination of the wider entrances in the inlet channels and the helix angles of the lands, as described, accomplishes a pumping action, moving the melt forward through the mixing section, therein allowing maximum throughput in an extrusion screw and minimum recovery time in an injection screw.

The melt that enters the inlet channels 21 must move forward and either over the barrier lands 20 or through the notches 26 into the outlet channel to exit the mixing section, or over the barrier-height conjunction 25 to exit the mixing section directly into the metering section "Mb". The thorough dispersive mixing action created by the shearing of any unmelted polymer as the polymer goes over the barrier lands 20, barrier-height conjunction 25 or through notches 26, assures the complete melting thereof, avoiding agglomerates or gels.

This dispersive mixing, combined with the distributive mixing created by the disorientation of the melt flow as it passes from a lower degree of helix angle in metering section "Ma" (of typically 17.7°) to the higher helix angles of the mixing section (typically 40° to 50°) and through the notches 26, and the continual wiping of the internal surface of the cylinder, provides a thorough mixing of the melt (including the mixing of colorant additives) achieving an isothermal melt quality with uniform viscosity and appearance.

The wiping action described is accomplished by the wiping lands 19 which have the same height and clearance between cylinder and screw as the screw flights in the metering sections "Ma" and "Mb". This clearance is based on the outside diameter of the screw with a typical clearance of 0.005 inches for a 4.5 inch diameter screw. The barrier lands 20 and barrier-height conjunctions 25 are undercut (extend radially outward from the screw root a lesser height) to a height which assures the complete melting of the resin but does not induce unwanted excessive shear heat which could cause thermal degradation. The barrier undercut depths vary with the outside diameter of the screw but are typically 25% of the meter section "Ma" flight depth, but never less than 0.030" or more than 0.060".

The width of the barrier lands also has an effect on pressure drop and the effectiveness of dispersive mixing. Typically, the barrier flight width should be at least 0.250" and not more than 0.600". While the widths of the barrier and wiping lands are preferably equal, they may of course take different values. The gradual tapering of the terminations of the inlet channels 23 and the tapering of the beginnings of the outlet channels 24, combined with polished radii of the edges of the notches 26, avoids any dead spots or hang-up areas where the melt could collect and cause thermal degradation or impede color changes.

Because pressure drop in a mixing section increases when the axial length of the mixing section is too short and pressure drop impedes the flow of melt through the mixer, the axial length of the mixing section "C" should be at least a minimum length of (typically) 2.5 times the outside diameter of the screw or, more specifically, the length of the lead of the wiping land calculated as: Mixer length = screw circumference x tangent of wiping land helix angle (typically 40°).

The number of inlet and outlet channels 21 and 22 depend upon the diameter of the screw, and upon the respective widths of the channels and lands. As with the lands, the channels preferably have equal widths (proportionately speaking), but the widths may be different. A minimum of two inlet and two outlet channels are believed necessary to maintain low pressure drop in the mixing section. Three inlet and outlet channels are preferred for relatively large diameter screws.

Metering section "Mb" follows the mixing section "C" and provides a final pumping action to avoid surging in an extrusion screw and to achieve the correct melt temperature for an injection screw. The metering section "Mb" also helps assure a melt ready for injection that is of uniform density and adequate volume for the shot size selected.

Figure 3:
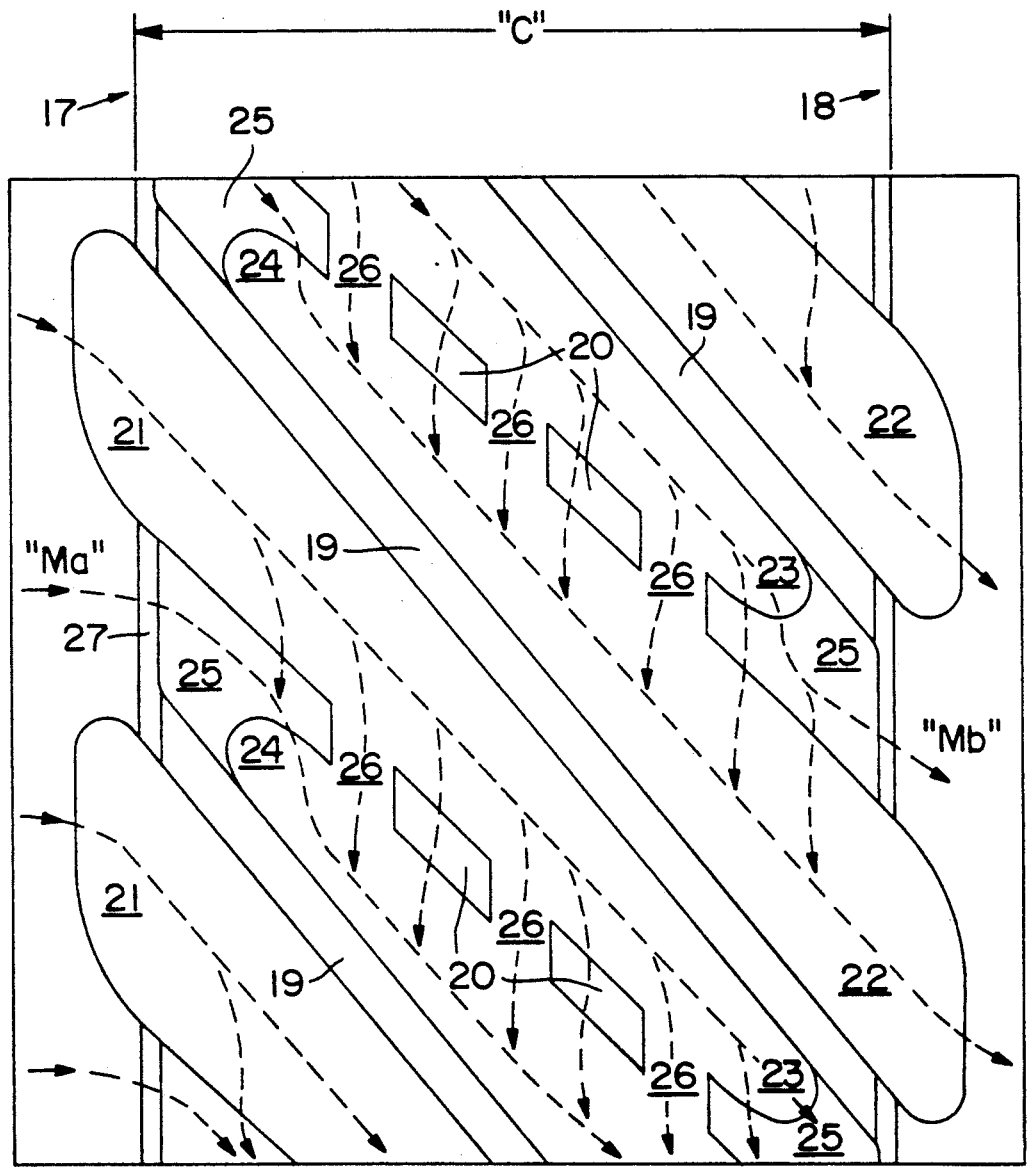
FIG. 3 is a development or planar projection of the mixing section shown in FIG. 2.

FIG. 3 is a planar projection of the mixing section according to the present invention which illustrates the flow of the melted polymer through that section using dotted line arrows. The wider entrances to the inlet channels 21 and the wider exits in the outlet channels 22 created by the differential in the helix angles of the wiping lands 19 and the barrier lands 20 are more evident in this projection. The disorientation of the melt flow through the notches 26 and the flow of the melt over the barrier lands 2 and barrier-height conjunctions 25 is also clearly illustrated. The importance of the gradual tapering of the terminations 23 of the inlet channels 21 and the tapered beginnings 24 of the outlet channels 22 to avoid hang-up areas is clarified by FIG. 3.

The present invention involves a unique combination of features, many of which were present in prior art. Helical lands in the mixing section of a screw were known to Lehnen (U.S. Pat. No. 3,652,064), Gregory (U.S. Pat. No. 3,788,614), Street (U.S. Pat. No. 3,941,535), and Colby (U.S. Pat. No. 4,752,136). However, none of the referenced inventions utilized the combination of both wiping and barrier lands in the helical configuration. This design feature is necessary to achieve maximum pumping action with the least pressure drop resulting in high throughput rates in an extrusion screw and minimum recovery time in an injection screw. The use of notches to alter the laminar flow of the material and achieve a thorough distributive mixing of the melted resin was known to Street and Lehnen (although Lehnen's design was specifically directed to the processing of rubber products). However, the reduction in the root diameter in the mixing section in combination with the notch areas and barrier land undercut area to achieve a volume or annular area in the mixer substantially equal (95%-100%) to the annular area of the screw just prior to the mixer was not known in prior art. The free-flowing concept achieved through these volumetric considerations is a critical factor in being able to run the screw at very high RPMs, even in processing amorphous materials (such as polycarbonate and rigid PVC), without generating excessive shear heat and/or material degradation. Although Lehnen utilized the concept of mixing lands with differing helix angles to cause melt homogenization (in rubber products), the use of alternating barrier lands to allow a greater flow area and consequently greater throughput was not embodied in his invention.

A summary of the combination of features in the present invention includes:

a. A mixing section the length of which is defined by the lead of a wiping land with an approximate 40° helix angle.
b. The mixing section having at least two alternating wiping and barrier lands.
c. The barrier lands having an approximate 50° helix angle resulting in inlet and outlet channels that are wider at the input and exit ends, respectively, of the mixing section.
d. The barrier lands having at least two notches each cut therefrom to promote mixing and throughput.
e. A reduced root diameter in the mixing section (as compared with the preceding meter section) which, when combined with the notch and barrier land undercut areas, is sufficient to allow the mixer to accept substantially all (95%-100%) of the melt volume from the preceding meter section screw channel.
f. Widened barrier lands at the conjunction with the wiping lands forcing the melt to flow either over the barrier-height conjunctions, the barrier lands themselves or through the mixing notches.

The unique combination of features in the present invention has produced remarkable processing results. An example is noted using a 62 MM injection molding machine screw with a 22:1 L/D ratio. The present invention was included in a test screw designed with the following profile and dimensional data:

| Zone | Data |
|---|---|
| Feed | 9.1 D |
| Transition | 5.9 D |
| Meter "a" | 2.5 D |
| Mixing section | 2.5 D |
| Meter "b" | 2.0 D |
| Feed flight depth | .510" |
| Meter "a" flight depth | .160" |
| Channel depth ratio | 3.19:1 |

D = screw diameter

The performance of this screw was compared with the injection molding machine manufacturer's standard general purpose 3-zone metering screw while processing polypropylene and high density polyethylene (highly crystalline materials) and polycarbonate (a very amorphous material), as follows:

| Material | Test Screw | G.P. Screw |
|---|---|---|
| Polypropylene - shot size (ounces) | 29.2 | 29.2 |
| Screw recovery (seconds) | | |
| @ 177 RPM | 23.9 | 27.0 |
| @ 191 RPM | 21.9 | (a) |
| Increase in melt temp | 2.3% (d) | (d) |
| @ 191 RPM | | |
| Polycarbonate - | 36.2 | 36.2 |

-continued

| Material | Test Screw | G.P. Screw |
| --- | --- | --- |
| shot size (ounces) | | |
| Screw recovery (seconds) @ 154 RPM | 18.8 | 27.0 |
| High density polyethylene (b) shot size (ounces) | 30.5 | (c) |
| Screw recovery (seconds) @ 191 RPM | 18.3 | (c) |
| Increase in melt temp | 0.0% (d) | |

Notes:
(a) G.P. Screw could not be run at 191 RPM which is machine's maximum speed.
(b) HDPE was tested on a second screw with shorter transition zone and a 3.4:1 channel depth ratio.
(c) G.P. screw not tested in HDPE.
(d) Tested by pyrometer; excess over heater band setting. G.P. screw not tested for heat increase.

The color mixing and melt quality achieved by the test screw was very good for all materials.

Another example of the substantially improved efficiencies attainable with the mixing section of the invention disclosed herein is seen by the fact that the plasticizer may be operated at an extremely high rate of speed without overheating or otherwise disturbing the extrudate material. The mixing section of this invention enables the screw of the invention to operate at speeds of up to 250 RPM without degrading the plastic.

An illustrative example of this improved effectiveness compares the performance of the present invention with a well-known (and still patented) barrier design screw. Both screws were tested processing polypropylene with 35%-40% regrind on a 24:1 L/D, 80 MM, 60-ounce capacity injection molding machine. The part produced was a colored, shampoo bottle closure with a "living" hinge and a snap-top fit. The dimensional size of the molded part was critical to assure that the lift pressure required to open the snap-top was within close tolerances. Performance data follows:

| | Test Screw | Barrier Screw |
| --- | --- | --- |
| Shot size (ounces) | 11.86 | 11.86 |
| Screw RPM | 245 | 245 |
| Recovery time (seconds) | 4.1 | 4.1 |
| Cycle time (seconds) | 15.4 | 17.4 |

The cycle time reduction occurred in reduced clamp time, the time necessary to keep the mold closed to allow stresses in the part to subside so that lift pressure tolerances could be met. The test screw did not overwork the material as did the barrier design, permitting a two-second reduction (11.5%) in total cycle time. The increase in operating speed as a direct result of the better condition of the plastic due to the mixing section of the instant invention translates into a substantial annual savings in the manufacture of the particular part involved.

From the foregoing, it will be seen that this invention is well adapted to achieve all objects set forth previously together with other advantages which are obvious and which are inherent to the structure.

Since many possible embodiments may be made of the invention without departing from the scope thereof, it is to be understood that all matters herein set forth or shown in the accompanying drawings is to be interpreted as illustrated, and not in a limiting sense.

Having thus described the invention, what is claimed is:

1. A thermoplastic material plasticizing screw for rotation within a plasticizer bore, said plasticizing screw comprising:

a screw root having a longitudinal axis, said screw root being rotatable about said longitudinal axis;

a metering section along said screw root and having a volume available for the flow of an extrudate through the metering section when the plasticizing screw is rotated within the plasticizer bore; and a mixing section along said screw root and immediately downstream from said metering section for receiving said extrudate from said metering section in an at least partially melted condition, said mixing section comprising:

at least two elongated inlet channels extending along said mixing section helically about said longitudinal axis of the screw root, each inlet channel having an upstream end and a downstream end and being relatively open to the passage of the extrudate at its upstream end and relatively closed to said passage at its downstream end;

at least two elongated outlet channels extending along said mixing section helically about said longitudinal axis of the screw root, each outlet channel having an upstream end and a downstream end and being relatively closed to the passage of the extrudate at its upstream end and relatively open to said passage at its downstream end, there being an outlet channel for each inlet channel on said screw section;

an elongated wiping land carried by said screw root in the mixing section for each inlet channel, each wiping land being disposed along a leading edge of its corresponding inlet channel between said inlet channel and an adjacent outlet channel and extending radially outwardly a first distance from said screw root longitudinal axis;

an elongated barrier land carried by said screw root in the mixing section for each outlet channel, each barrier land being disposed along a leading edge of its corresponding outlet channel between said outlet channel and an adjacent inlet channel and extending radially outwardly from said longitudinal axis a second distance which is less than said first distance to define an undercut, the wiping land and the barrier land extending helically along said mixing section at different helix angles;

the helix angle for said wiping land being about 40° and the helix angle for said barrier land being about 50° whereby the width of the inlet channel is reduced in the downstream direction;

at least two notches extending transversely through each barrier land to permit the flow of the extrudate from an inlet channel through said notch to the adjacent outlet channel;

said screw root having a first diameter in said metering section and a second diameter is said mixing section, said second diameter being less than said first diameter, said second diameter and the sizes of said notches combined with the barrier land undercut areas being sufficient to accept substantially all (95% to 100%) of the volume of melted extrudate from the metering section immediately upstream from the mixing section; and the wiping lands and the barrier lands conjointly forming barrier dams at their respective ends over which the extrudate must flow on entering and exiting the mixing section.

2. The plasticizing screw as set forth in claim 1, wherein said barrier land is widened at said leading edge of its associated outlet channel to form said barrier dam which extends outwardly from said screw root longitudinal axis a distance which is less than said first distance of said wiping land.

3. The plasticizing screw as set forth in claim 2, wherein said barrier dam contacts said adjacent wiping land.

4. The plasticizing screw as set forth in claim 3, wherein the difference between the first distance of said wiping land and the second distance of the barrier land is between approximately 0.030" and 0.060".

5. The plasticizing screw as set forth in claim 4, wherein said outlet channel has an increasing depth from said upstream end to a downstream end of the outlet channel and said inlet channel has a decreasing depth from said upstream end to a downstream end of the inlet channel.

6. The plasticizing screw as set forth in claim 5, including wiping lands in the metering section extending outward from the longitudinal axis the same distance as said wiping lands in the mixing section.

7. The plasticizing screw as set forth in claim 1, wherein said plasticizing screw is an extruder screw.

8. The plasticizing screw as set forth in claim 1, wherein said plasticizing screw is an injection screw.

* * * * *